No. 689,312. Patented Dec. 17, 1901.
W. E. KELLY.
DUST PAN.
(Application filed Mar. 5, 1900.)
(No Model.)
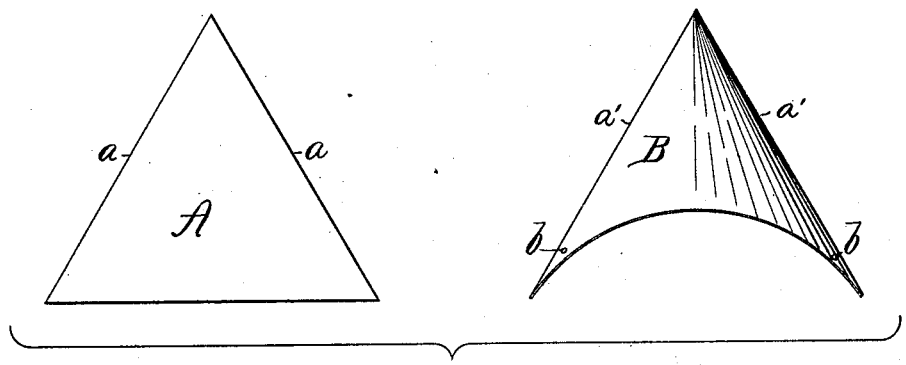
Fig. 1
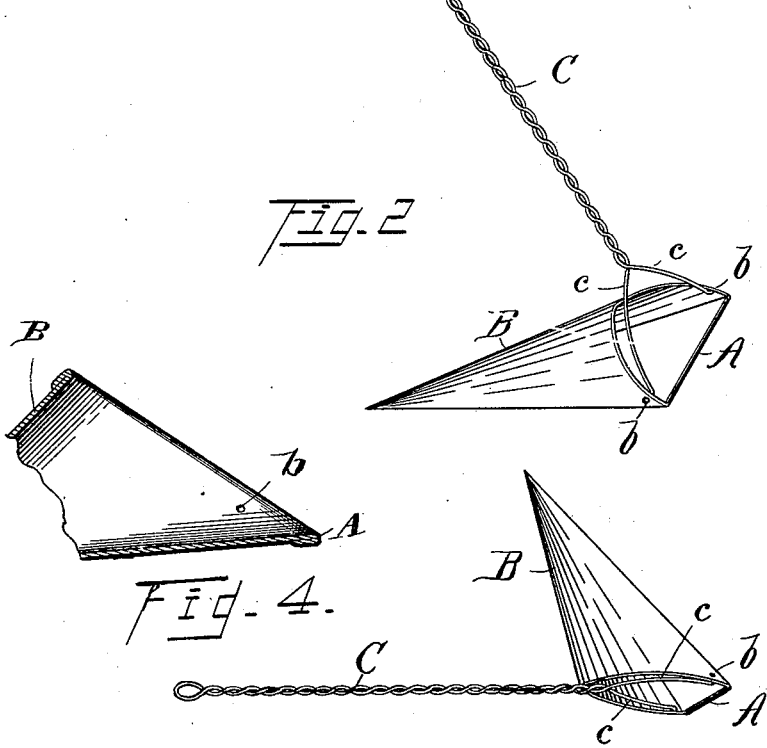
Fig. 2
Fig. 4.
Fig. 3
Witnesses:
F. Griswold
Geo. A. Metzger.
Inventor.
William E. Kelly
by Albert H. Weed,
his attorney.

United States Patent Office.

WILLIAM E. KELLY, OF CLEVELAND, OHIO, ASSIGNOR OF TWO-THIRDS TO KATHERINE J. WEED AND ALBERT H. WEED, OF CLEVELAND, OHIO.

DUST-PAN.

SPECIFICATION forming part of Letters Patent No. 689,312, dated December 17, 1901.

Application filed March 5, 1900. Serial No. 7,329. (No model.)

*To all whom it may concern:*

Be it known that I, WILLIAM E. KELLY, a citizen of the United States, residing at No. 38 Melrose avenue, in the city of Cleveland, county of Cuyahoga, and State of Ohio, have invented certain new and useful Improvements in Dust-Pans, of which the following is a specification.

This invention relates to dust-pans; and it consists in the new construction and combinations, substantially as hereinafter described, and pointed out in the claim.

The nature and operation of the invention will appear from the following description when considered in connection with the accompanying drawings, in which—

Figure 1 shows two triangular plates out of which the pan is made, A being the bottom plate, and B being the top plate curved so as to be placed upon the bottom plate and the two attached together at their side edges. Fig. 2 is a perspective view of the dust-pan in position ready for use. Fig. 3 is a perspective view of the dust-pan when in position for emptying. Fig. 4 is a detail sectional view through a portion of the dust-pan.

A is a triangular flat plate constituting the bottom of the pan.

B is an upwardly-curved triangular plate, which is placed upon plate A, and the two are substantially hemmed or ribbed together at their edges $a\,a$ and $a'\,a'$. The front edge of plate A is hemmed or reinforced, so that thereby in connection with the two edges $a\,a$, hemmed and ribbed to the edges of plate B, a firm rigid flat bottom is secured, and in connection with the upwardly-curved plate B a pocket or receptacle for dust is formed.

C is a handle, of sufficient length to enable the user to use it without stooping. This handle at its lower end spreads out into a bail, the ends of the prongs $c\,c$ of which are loosely pivoted in eyes $b\,b$ in plate B, placed as near to the lower front corners of the same as can be done and leave sufficient strength in the surrounding metal to hold the handle when in use without breaking.

The object in pivoting the handle as near to the front of the pan as possible is, first, to enable the person using it to press the front edge or lip close to the floor, so as to catch the fine dust, and, second, when the handle, being in a horizontal position, is turned so as to invert the pan the greater part of the weight of the pan being toward the handle will cause the pan to assume a position resting upon the prongs of the bail, as in Fig. 3, thus giving an easy and expeditious way of emptying the pan without requiring the use of both hands.

I am aware that prior to my invention dust-pans with pockets or receptacles for the dust at the rear end of the same have been made and that such pans have also been pivoted to handles long enough so that the user can use the same without stooping and so constructed that when the pan is lifted the rear portion will hang down, and thus secure a safe receptacle for the dust and litter. I therefore do not claim such a combination broadly; but What I do claim as my invention, and desire to secure by Letters Patent, is—

A dust-pan comprising a suitable body portion having a flat bottom and a cover or top forming a pocket for the reception of sweepings, a bail or handle having prongs at its attaching end, the said prongs being pivoted to the sides of the pan close to their lower edges and at the front edge thereof so that substantially all of the pan is in rear of the pivotal connections and so that the front edge of the pan can be held down to its work, the handle being arranged to fall back upon the top of the pan when the pan is lifted from the floor, the prongs approximately coinciding with the front edge of said pan and so as not to obstruct the mouth of the pan, the construction being such that by rotating the handle in a horizontal position the pan can be made to fall back upon the prongs of said handle so as to discharge the contents of the pan; substantially all of the pan when in a dumping position being above the prongs, substantially as described.

In testimony whereof I have signed my name to this specification in the presence of two subscribing witnesses.

WILLIAM E. KELLY.

Witnesses:
   EDWARD B. WEED,
   MAY E. STRAUSS.